United States Patent Office 3,594,327
Patented July 20, 1971

---

3,594,327
PROCESS FOR MAKING MINUTE CAPSULES AND CAPSULE PRODUCT
Julius G. Becsey, Dayton, Ohio, assignor to The National Cash Register Company, Dayton, Ohio
No Drawing. Continuation of abandoned application Ser. No. 622,369, Mar. 10, 1967, which is a continuation of abandoned application Ser. No. 151,449, Nov. 10, 1961. This application Mar. 28, 1969, Ser. No. 837,967
Int. Cl. B01j *13/02;* B44d *1/02, 1/44*
U.S. Cl. 252—316
9 Claims

ABSTRACT OF THE DISCLOSURE

A process for making minute capsules in which minute particles of water-immiscible material, such as iron oxide, and hydrophilic, film-forming polymeric material, such as gelatin, are dispersed in water; coacervation is induced which causes the polymeric material to deposit on each of the minute particles as a liquid wall; and a metallic chelating salt, such as chromic chloride or copper sulfate, is added to harden and water-insolubilize the liquid deposit to produce the minute, rigid-walled capsules.

---

This application is a continuation of application Ser. No. 622,369, filed Mar. 10, 1967 and now abandoned, which is in turn a continuation of application Ser. No. 151,449, filed Nov. 10, 1961, also now abandoned.

This invention relates to a process for making capsules en masse in an aqueous vehicle, and to the capsule product. Particularly the process consists of the liquid deposition of a seamless wall of an aqueous coacervate of polymeric material around each of a profusion of water-insoluble core particles kept dispersed in such an aqueous vehicle, and the solidification of the deposited wall material.

The invention is an advance over previously known processes which require the use of temperature-gelable materials, in that the process of this invention may be carried on at a single temperature, if desired, and in that the vehicle may be kept either at room temperature, above room temperature, or below room temperature to accommodate temperature-sensitive core materials. The core materials may be either liquid or solid, homogeneous or of mixed composition, and even changeable in physical state according to the temperature of the vehicle and its contents. Moreover, the use of artificial wall-forming materials permits of the use of those that coacervate either under acid or alkaline conditions, thus making possible the encapsulation of core materials that are pH sensitive, one way or another, by the judicious choice of polymeric materials.

The process is applicable to the manufacture of capsules ranging in size from the microscopic (5 microns and under) up to those that are macroscopic (5000 microns and over), thus providing a means to manufacture capsules that cannot be individually handled. The capsules made according to the process are essentially globular in shape but may be distorted due to the shape of the core material particles or to the shear forces occurring by reason of the agitation of the vehicle.

The process involves the treatment of film-forming organic hydrophilic polymeric materials and particle solid bits or liquid drops of substantially water-insoluble intended nucleus materials dispersed in an agitated aqueous manufacturing vehicle, the organic polymeric materials either combining by reason of coacervate forces into minute complex polymer liquid units which, because of their limited solubility in the aqueous vehicle, are deposited on and around each core particle, there to coalesce and form a liquid wall, or so depositing because of becoming and forming coacervate polymer units that have been rendered insoluble in the aqueous vehicle by means other than forming complexes. The deposited and coalesced liquid wall material thereafter is subjected to chemical treatment to render it solid and water-insoluble, thus completing the capsules which may be recovered from the residual aqueous medium, if desired.

In contrast to previously-known processes for making such minute capsules en masse with gelable hydrophilic polymeric materials, the process of this invention utilizes hydrophilic polymeric materials that do not gel as a function of temperature; hence, the costly and time-consuming process steps of heating and chilling, which are required when temperature-gelable materials are used, are eliminated, and the process may be carried on over a wide range of naturally-occurring or artificially produced environmental temperatures.

Because the manufactured temperatures are not critical, materials that require either refrigeration temperatures or rather warm temperatures, for their preservation, may be encapsulated.

Therefore, by this invention there is provided a process, which may be carried on over a wide range of pH and temperature conditions, for the encapsulation of materials that either are sensitive to temperatures which may vary from room temperature, or are materials that are sensitive to particular pH conditions. Temperatures below room temperature may be used in the process to preserve core material that is subject to heat-deterioration at room temperature or above, and the capsules so made may be kept at a low temperature, to preserve the nucleus contents. On the other hand, the process may be utilized for the encapsulation of materials which are gases or highly-volatile liquids at room temperature but which are liquids at temperatures between room temperature and the freezing point of the aqueous manufacturing vehicle and contents. If cold-sensitive materials are to be encapsulated, warmer-than-room-temperature processing and storage environment may be used.

The materials for forming the capsules may be introduced into the aqueous manufacturing vehicle in any order. If the commencement of coacervation is prevented for a time by a change in the condition of the aqueous vehicle from that during which coacervation occurs, the capsule-forming ingredients as contained in the aqueous medium may be stored until it is desired to use such, and in its broadest conception the process may begin with such an aqueous vehicle containing all the ingredients necessary for forming the capsules. Even if premature coacervation of the polymeric materials has occurred without deposition and solidification on nucleus bits, the material may be decoacervated by reversing the conditions, and then recoacervating and resuming the process with agitation. A formulated composition thus may be stored with or without the aqueous vehicle, ready for subsequent restoration and processing.

The invention will be described in general terms with a preferred and other embodiments which will indicate its broad scope. The term "room temperature" is used broadly and may be taken to mean between 20° and 25° centigrade, more or less.

Regarding the process when complex coacervation is used, there are certain optimum conditions associated with each pairing of oppositely-charged organic hydrophilic polymeric materials, under which the most efficient complex coacervation takes place in an aqueous manufacturing vehicle. These conditions mainly concern the pH of the system and the concentration of the polyemric materials therein. A too-concentrated dispersion of the polymeric units in the vehicle will not provide the amount of mobile freedom necessary for oppositely-charged polymeric units to form complex units easily, while a toosparse supply of polymeric units in the vehicle will result in a corresponding lack of complex units in the system, as a whole, to give usable results as to the formation of capsules taking into consideration the amount of core material supplied. Starting with several percent, by weight, based on the weight of the system, of the different complexing polymeric materials in the aqueous manufacturing vehicle, and the introduction thereinto of the intended core material in an amount to equal several times that of the polymeric material used, the system is agitated, and its pH and amount of polymeric material are adjusted, if adjustment of either or both is necessary, to a point where a microscopic examination of a drop of the system shows that an adequate complex coacervate liquid phase has been produced and deposited as a liquid film on the nucleus material. After the optimum date has been obtained for a certain pair of polymeric materials, such may be used for controlling large-scale manufacture employing the same materials. The proportional quantities of the aqueous vehicle, the capsule wall materials, and the core materials may be varied widely, as desired. The best pH adjustment of a particular aqueous system is dependent on the ionic groups on the units of polymeric material employed, and such pH adjustment range is best ascertained by the above-mentioned visual microscopic examination of a trial dispersion. The pH at which the maximum difference in ionic charge occurs in an aqueous dispersion of two differently-charged polymeric materials initially may be obtained by electrophoresis and proved in actual practice by the aforesaid microscopic examination to determine whether the desired amount of coacervate material has deposited on the core particles.

With the foregoing in mind, the preferred embodiment, with the encapsulation of oil droplets in rigid complex polymeric wall material, at room temperature and at pH 7, will be given as Exampe I.

EXAMPLE I

By this perferred example, it is proposed to encapsulate in a rigid complex of gum arabic and polyvinylimidazole, at room temperature, trichloro-trifluoroethane, which readily evaporates above room temperature, in the following manned:

Introduce into a manufacturing vessel—

|  | Milliliters |
|---|---|
| 5 percent, by weight, aqueous solution of polyvinylimidazole | 100 |
| 5 percent, by weight, aqueous solution of gum arabic | 100 |
| Water | 300 | and adjust the system to a pH above 9.5 to inhibit the immediate formation of complex units, it having been previously found that the complex coacervation pH range for the polymeric materials involved begins at pH 7.5, extends into the most efficient complexing pH range at 6.7 to 7.0, and tapers off at lower pH values. Then, with agitation, there is added 25 milliliters of trichloro-trifluoro-ethane and, by controlling the degree of agitation, the drop size of the liquid nucleus material is reduced to the desired average diameter, say 100 microns, and the pH is adjusted downwardly to 6.9 to 7.0 as quickly as possible, whereupon the now-formed liquid complex coacervate units of gum arabic and polyvinylimidazole deposit as a liquid film around each of the oil droplets.

With continued agitation, to keep the liquid-walled capsules from clustering, there is added an aqueous solution of a metallic chelating salt such as $CrCl_3$ or $CuSO_4$ to form the liquid walls into a rigid water-insoluble condition. Five milliliters of a 10 percent, by weight, aqueous solution of $CrCl_3$, for instance, may be used. The capsule walls, by such treatment, became rigid and may be recovered, in a self-supporting but pressure-rupturable condition, from the residual manufacturing liquid vehicle, by filtering, spray-drying, centrifuging, and the like. While $CrCl_3$ takes some hours for full effect, a similar solution of $CuSO_4$ takes effect at once on the particular polymeric material complex formed.

If uniformity of the drop size of the liquid nucleus material and corresponding finished capsule size is not important, a less uniform product may be made by agitating the solution of polymeric materials and liquid nucleus materials at a pH in the coacervate range, without first resorting to the drop formation of the nucleus material while the system is kept at the high pH to inhibit coacervation of the polymeric material.

It is to be noted that, if the polymeric materials have been coacervated into a liquid complex and still are maintained in liquid form, such complexes may be decoacervated by changing the pH of the system out of the coacervate range; hence, the order of introduction of the polymeric materials and nucleus materials into the aqueous medium is unimportant, as the complex polymeric units may be decoacervated and recoacervated at will by a change in pH, if such is desired or required.

If solid core material is to be used, and the same holds true for all examples, and the particle bit size is established before introduction of it into the aqueous manufacturing vehicle, it makes no difference as to the time or order of introduction of the materials into the aqueous vehicle as long as it occurs while the materials are still in a liquid state. If the solid nucleus material used is to be comminuted to the desired bit size in the aqueous vehicle, the rate of agitation and the time of introduction are made conformable to the materials used.

The capsules made by the foregoing method may have walls that are too brittle, and such may be plasticized by treatment with plasticizing materials. For instance, in the foregoing example, the insolubilized and rigid-walled capsules may be treated in the aqueous manufacturing vehicle by introducing thereinto 40 milliliters of a 75 percent, by weight, aqueous solution of sorbitol, with stirring for several hours or more depending on the thickness of the deposited wall. Other comparable and well-known plasticizers which are compatible with the particular capsule-forming materials may be used in place of sorbitol.

EXAMPLE II

In this example, the polymers gum arabic and polyethylenimine are used. They form complex coacervate units in an aqueous medium at a pH range peaking at pH 9.

Into a manufacturing vessel is introduced—

|  | Milliliters |
|---|---|
| 2.4 percent, by weight, aqueous solution of polyethylenimine | 100 |
| 0.6 percent, by weight, aqueous solution of polyethylenemaleic anhydride | 100 |
| 4 percent, by weight, aqueous solution of gum arabic | 100 |
| Water | 200 |

Preferably, the polymer solution is mixed at room temperature and the pH is adjusted to 11, which is above the coacervation range, after which the intended core material is added, which, for purposes of illustrating the use of solid core material, may be powdered black magnetic iron oxide in an amount of 4 percent, by volume. The pH is then lowered to 9.5, at which the coacervation of the polymeric materials into complex units takes place. The complex units of coacervate material form a liquid wall around each particle of core material, which wall may be hardened by stirring in 5 milliliters of a 25 percent, by weight, aqueous solution of glutaraldehyde and plasticized as explained in Example I.

EXAMPLE III

In this example, citrus pectin is substituted for the gum arabic of Example I in a corresponding relative amount, such pectin, for instance, being selected so as to have a molecular weight of between 150,000 and 300,000, and such being used for its negative ionic charge and not chosen for any temperature-gelification properties which it may have.

The foregoing examples are directed to the use of complexing materials for the production of a liquid coacervate wall-forming phase.

There are shown in the literature, and particularly in "Colloid Science," volume II, edited by H. R. Kruyt and published by Elsevier Publishing Company, Incorporated, of New York City, in 1949, a number of hydrophilic polymeric film-forming materials that will form coacervate liquid phases in an aqueous medium, in and of themselves without the formation of complexes, and with changes of condition other than adjustment of the pH of the manufacturing medium; for instance, as by the use of a coacervating salt such as sodium sulfate. If the selected polymer in coacervate state will form a film, like gelatin, it may be used as the coacervate polymeric material and deposited on wettable core particle material, which with subsequent treatment with cross-linking and chelating water-insolubilizing and hardening materials to accomplish the same purpose as set out in the more specific examples, without temperature-gelation being involved. Of positively charged or chargeable artificial polymeric materials, in addition to the mentioned polyvinylimidazole and polyethylenimine, may be mentioned polyvinylamine, and poly-2-methyl-5-vinyl pyridine. Any of these alone or in mixtures may be used to complex with the negatively charged or chargeable gum arabic and pectin which have been mentioned, or with low iso-electric point gelatin, ethylenemaleic anhydride copolymer, or equivalents. Thus, many combinations of wall materials are afforded, which will form coacervate phases in aqueous media to encapsulate dispersed core particles with walls that may be made rigid by cross-linking or chelation.

The process of the invention is such that the user, by judicious choice of wall materials is not bound by the former limitations in the making of capsules en masse in an aqueous vehicle in that (a) temperature-gelation is not involved, (b) pH sensitive core materials may be encapsulated, and (c) the uniformity of artificial polymeric materials is afforded if such are used.

What is claimed is:

1. A method of making, en masse, minute capsules, each of which comprises a core of substantially water-immiscible material contained within a hardened and water-insolubilized wall consisting essentially of hydrophilic, film-forming, polymeric material, consisting of the steps of
    (a) with agitation, in any order, dispersing in an aqueous vehicle minute core particles of water-immiscible material and essentially hydrophilic, film-forming, polymeric material,
    (b) with agitation, including coacervation to bring about the formation of a liquid coacervate phase of the polymeric material which deposits on each of the dispersed core particles as a liquid wall, said step of inducing coacervation being either
        (I) adjusting the pH of the system, or
        (II) adding a coacervating salt to the aqueous vehicle, and
    (c) with agitation, introducing into the resulting aqueous vehicle and its contents a metallic chelating salt selected from the group consisting of chromic chloride and copper sulfate which hardens and water-insolubilizes the liquid walls to produce rigid-walled capsules.

2. Capsules made according to claim 1.

3. The method of claim 1 in which coacervation is induced by adjusting the pH of the system.

4. The method of claim 1 in which coacervation is induced by adding a coacervating salt to the aqueous vehicle.

5. The method of claim 1 in which the polymeric materials are selected from the group consisting of
    (I) gelatin;
    (II) gum arabic;
    (III) ethylenemaleic anhydride copolymer;
    (IV) polyethylenimine;
    (V) polyvinylamine;
    (VI) poly-N-vinylimidazole; and
    (VII) poly-2-methyl-5-vinyl pyridine.

6. The method of claim 1 in which the coacervation is induced during the dispersion of the polymeric material in the aqueous vehicle.

7. The method of claim 1 in which the coacervation is induced after the polymeric material is dispersed in the aqueous vehicle.

8. The method of claim 1 in which the core material is volatile at room temperature and the method is carried on below room temperature.

9. The method of claim 1 in which the core material is cold-sensitive at room temperature and the method is carried on above room temperature.

References Cited

UNITED STATES PATENTS

| | | | |
|---|---|---|---|
| 2,655,864 | 10/1953 | Newman | 117—62.2X |
| 2,800,457 | 7/1957 | Green et al. | 252—316 |
| 3,069,370 | 12/1962 | Jensen et al. | 252—316X |

RICHARD D. LOVERING, Primary Examiner

U.S. Cl. X.R.

117—62.2, 100; 264—4; 424—33, 34, 37

UNITED STATES PATENT OFFICE
CERTIFICATE OF CORRECTION

Patent No. 3,594,327          Dated July 20, 1971

Inventor(s) Julius G. Becsey

It is certified that error appears in the above-identified patent and that said Letters Patent are hereby corrected as shown below:

Claim 1, line 11, "including" should be --inducing--.

Signed and sealed this 18th day of April 1972.

(SEAL)
Attest:

EDWARD M. FLETCHER, JR.          ROBERT GOTTSCHALK
Attesting Officer                Commissioner of Patents